United States Patent
Troshin et al.

(10) Patent No.: US 12,373,389 B2
(45) Date of Patent: *Jul. 29, 2025

(54) ENTITY SNAPSHOTS PARTITIONING AND COMBINING

(71) Applicant: Oracle International Corporation, Redwood Shores, CA (US)

(72) Inventors: Sergey Troshin, Santa Clara, CA (US); Sachin Bhatkar, Sunnyvale, CA (US); Sunil Kunisetty, Fremont, CA (US); Shivakumar Subramanian Govindarajapuram, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,267

(22) Filed: Dec. 15, 2023

(65) Prior Publication Data

US 2024/0119026 A1    Apr. 11, 2024

Related U.S. Application Data

(63) Continuation of application No. 16/399,256, filed on Apr. 30, 2019, now Pat. No. 11,874,794.

(60) Provisional application No. 62/748,354, filed on Oct. 19, 2018.

(51) Int. Cl.
*G06F 16/11*  (2019.01)
*G06F 16/9035*  (2019.01)
*G06F 16/9038*  (2019.01)

(52) U.S. Cl.
CPC ........ *G06F 16/128* (2019.01); *G06F 16/9035* (2019.01); *G06F 16/9038* (2019.01)

(58) Field of Classification Search
None
See application file for complete search history.

(56) References Cited

U.S. PATENT DOCUMENTS

| | | | |
|---|---|---|---|
| 2006/0253414 A1* | 11/2006 | Mittal | G06F 16/283 |
| 2008/0034327 A1 | 2/2008 | Cisler et al. | |
| 2015/0066857 A1* | 3/2015 | Dayal | G06F 16/128 |
| | | | 707/639 |
| 2015/0358790 A1* | 12/2015 | Nasserbakht | G06F 21/32 |
| | | | 726/19 |

(Continued)

*Primary Examiner* — Neveen Abel Jalil
*Assistant Examiner* — John J Morris
(74) *Attorney, Agent, or Firm* — .Invoke

(57) ABSTRACT

Embodiments relate to improving efficiency of data analytics performed on sets of entity data in which different entity properties having very different update frequencies. Time-based analytical queries track the entity states at each moment within a given time window. Analytical queries are executed over a massive number of entity states while using a reasonable memory footprint. The technique partitions the entity properties into partial historical snapshots of data and combines the partial snapshots on demand only as needed to execute analytical queries over business entities. A complete entity state having values for all entity properties is not required to execute most queries. Only partial snapshots including values referenced by the query need to be combined to satisfy the query. Using partial snapshots minimizes data replication, and the snapshots can be efficiently combined into entity states sufficient for query execution.

20 Claims, 10 Drawing Sheets

(56) References Cited

U.S. PATENT DOCUMENTS

2016/0283890 A1 9/2016 Diehl
2017/0206212 A1* 7/2017 Srivilliputtur Mannarswamy ......
G06F 3/067
2017/0242591 A1* 8/2017 Jagannath ............. G06F 3/0644

* cited by examiner

FIG. 5A

| Timestamp | Data Source | value |
|---|---|---|
| 10 | Sensor1 | S1 |
| 20 | Sensor2 | S2 |
| 30 | Sensor1 | S3 |
| 40 | Sensor2 | S4 |
| 50 | Sensor1 | S5 |
| 60 | Sensor2 | S6 |
| 70 | Sensor1 | S7 |

FIG. 5B

| Timestamp | Data Source | value |
|---|---|---|
| 15 | Metric1 | M1 |
| 35 | Metric2 | M2 |
| 50 | Metric2 | M3 |
| 65 | Metric 1 | M4 |

FIG. 5C

| Timestamp | Data Source | value |
|---|---|---|
| 5 | Configuration1 | C1 |

| Timestamp | Property 1 | Property 2 |
|---|---|---|
| 10 | S1 | |
| 20 | S1 | S2 |
| 30 | S3 | S2 |
| 40 | S3 | S4 |
| 50 | S5 | S4 |
| 60 | S5 | S6 |
| 70 | S7 | S6 |

FIG. 5D

| Timestamp | Property 3 | Property 4 |
|---|---|---|
| 15 | M1 | |
| 35 | M1 | M2 |
| 50 | M1 | M3 |
| 65 | M4 | M3 |

FIG. 5E

| Snapshot id | Timestamp | Snapshot Type | Values |
|---|---|---|---|
| CS1 | 5 | Configuration | C1 |
| SS1 | 10 | Sensor | S1, null |
| MS1 | 15 | Metric | M1, null |
| SS2 | 20 | sensor | S1, S2 |
| SS3 | 30 | Sensor | S3, S2 |
| MS2 | 35 | Metric | M1, M2 |
| SS4 | 40 | Sensor | S3, S4 |
| SS5 | 50 | Sensor | S5, S4 |
| MS3 | 50 | Metric | M1, M3 |
| SS6 | 60 | Sensor | S5, S6 |
| MS4 | 65 | Metric | M4, M3 |
| SS7 | 70 | Sensor | S7, S6 |

FIG. 6A

| Timestamp | Sensor | Metric | Configuration |
|---|---|---|---|
| 5 | | | CS1: C1 |
| 10 | SS1: S1, null | | CS1 |
| 15 | SS1: S1, null | MS1: M1, null | CS1 |
| 20 | SS2: S1, S2 | MS1: M1, null | CS1 |
| 30 | SS3: S3, S2 | MS1: M1, null | CS1 |
| 35 | SS3: S3, S2 | MS2: M1, M2 | CS1 |
| 40 | SS4: S3, S4 | MS2: M1, M2 | CS1 |
| 50 | SS5: S5, S4 | MS3: M1, M3 | CS1 |
| 60 | SS6: S5, S6 | MS3: M1, M3 | CS1 |
| 65 | SS6: S5, S6 | MS4: M4, M3 | CS1 |
| 70 | SS7: S7, S6 | MS4: M4, M3 | CS1 |

FIG. 6B

| Timestamp | Property 1 | Property 2 | Property 3 | Property 4 | Property 5 |
|---|---|---|---|---|---|
| 5 | | | | | C1 |
| 10 | S1 | | | | |
| 15 | | | M1 | | |
| 20 | | S2 | | | |
| 30 | S3 | | | | |
| 35 | | | | M2 | |
| 40 | | S4 | | | |
| 50 | S5 | | | M3 | |
| 60 | | S6 | | | |
| 65 | | | M4 | | |
| 70 | S7 | S6 | M4 | M3 | C1 |

FIGURE 6C

ENTITY SNAPSHOTS PARTITIONING AND COMBINING

INCORPORATION BY REFERENCE; DISCLAIMER

Each of the following applications are hereby incorporated by reference: application Ser. No. 16/399,256 filed on Apr. 30, 2019; Application No. 62/748,354 filed Oct. 19, 2018. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to data analytics. In particular, the application relates to various techniques to combine partial entity snapshots to generate combined entity snapshots.

BACKGROUND

Data may be collected on a large number of properties of a business entity in which the collective values of the properties represent a state of the business entity that is maintained for many time points. Rather than log the entire entity state every time one state value changes, a separate log entry with the updated value and a timestamp may be created each time an entity property value changes. A benefit to this approach is that only the updated value and timestamp needs to be logged. Values that have not changed do not need to be stored redundantly for every new entity state. However, upon receiving a query regarding the state of an entity at a particular point in time, the log file(s) would have to be processed to find the latest updated value for every entity property as of the particular point in time in order to construct the entire state of the entity before the query could be executed. This may be very computationally intensive. Such an approach may save space at the cost of increased computation.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A, 5B, and 5C illustrate snapshots representing different points in time for sensor data, metrics data, and configuration data respectively, in accordance with one or more embodiments;

FIG. 5D illustrates a combined partial snapshot for sensor data similar to snapshot 470 in FIG. 4, and FIG. 5E illustrates a combined partial snapshot for metrics data similar to Snapshot 475 in FIG. 4, in accordance with one or more embodiments;

FIG. 6A illustrates a list of partial snapshots from FIGS. 5A, 5B, and 5C that have been merged and sorted in timestamp order, in accordance with one or more embodiments;

FIG. 6B illustrates the list of combined snapshots that are combined over time from FIG. 6A, in accordance with one or more embodiments;

FIG. 6C illustrates the property values included in the list of combined snapshots in FIG. 6B, in accordance with one or more embodiments;

Figure 1:
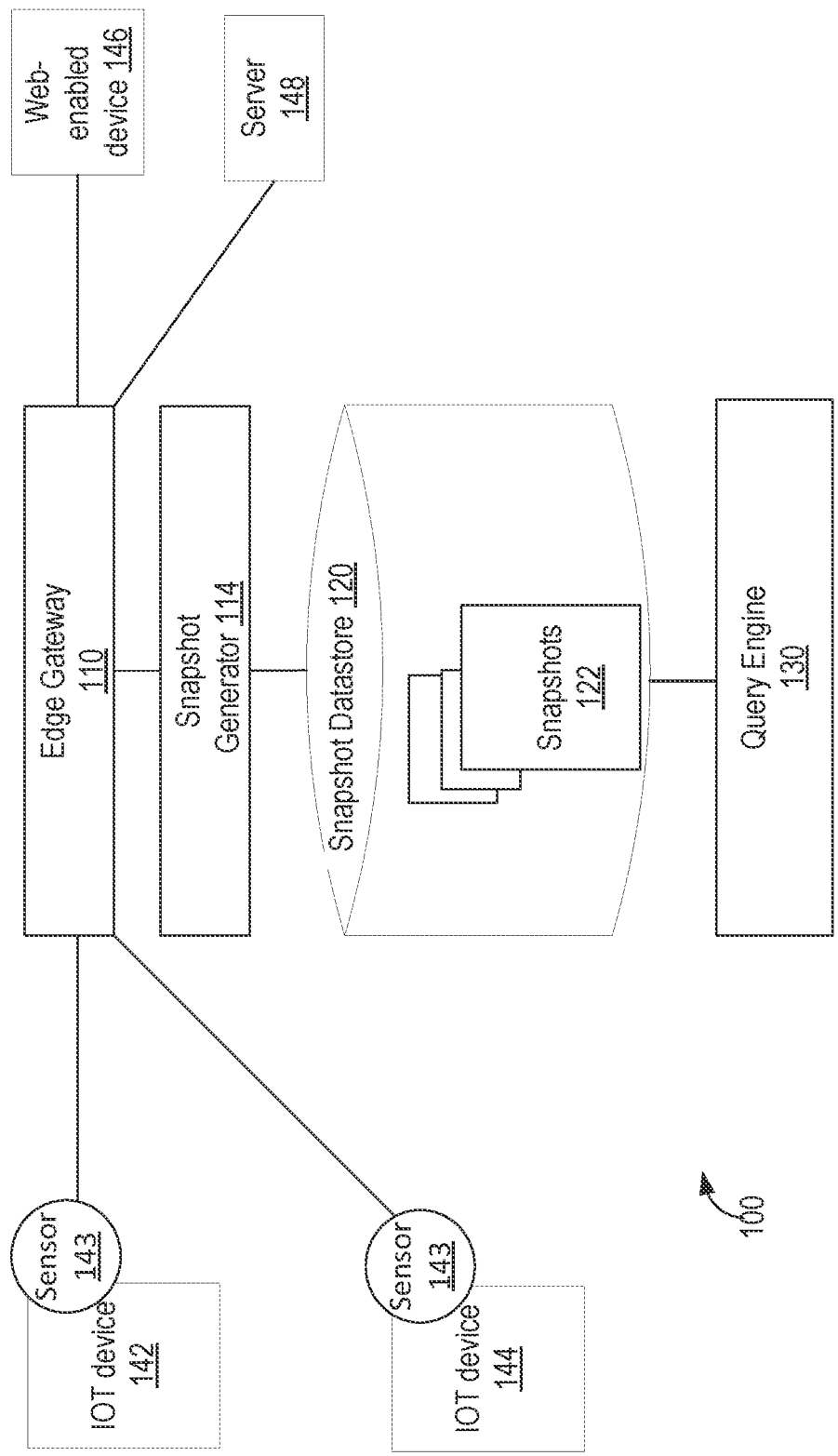
FIG. 1 illustrates a block diagram of a data analytics system, in accordance with one or more embodiments.

Components in block diagrams and operations in flow diagrams may be added, removed, modified, or combined. Functionality described in relation to one component/operation may instead be implemented by another component/operation. Accordingly, the specific components/operations illustrated and/or described herein should not be construed as limiting the scope of any of the claims.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

A data analytics system examines potentially large sets of data representing states of entities. Entities managed by Internet of Things (IoT) Cloud Services (CS) have numerous properties that change over time. IoT CS supports analytical queries across the entities, the queries requiring the ability to aggregate property values and to count entities filtered by a predicate on property values. Supporting time-based analytical queries includes tracking the entity states at various moments within a time window. Each time a property value changes, the entity state changes. Having tens of properties with at least some of the properties changing frequently quickly generates a large number of entity states to be regarded by a query. The challenge is to maintain access to a large number of entity states while using a reasonable memory footprint and efficient execution of analytical queries.

One or more embodiments combine partial snapshots as needed for query execution. The system partitions values for entity properties into partial historical snapshots of data. A query may reference a particular point-in-time and properties captured by different partial snapshots. Partial snapshots may be selected and combined for execution of the query. A partial snapshot is selected from a candidate set of partial snapshots that (a) include a value for a property referenced by the query and (b) correspond to timestamps that are equivalent to or prior to the point-in-time referenced by the query. Of the candidate set of partial snapshots for a referenced property with corresponding timestamps that are equivalent to or prior to the point-in-time, the partial snapshot corresponding to a most recent time is selected. A selected partial snapshot includes the last known value of the referenced property at the point-in-time. Multiple partial snapshots associated with respective properties and selected for combination may themselves correspond to different timestamps. Multiple partial snapshots corresponding respectively to different properties referenced by the query are combined to generate a combined snapshot. The combined snapshot may be a complete snapshot that includes values for all entity properties as of the point-in-time. Alternatively, the combined snapshot may be an incomplete snapshot that includes values for a subset of entity properties, referenced by the query, as of the point-in-time (but does not include values for all entity properties as would be included in the complete snapshot).

Using partial snapshots minimizes data replication, and the snapshots can be efficiently combined into entity states sufficient for query execution.

Some embodiments described in this Specification and/or recited in the claims may not be included in this General Overview section.

2. System Architecture

FIG. 1 illustrates a block diagram of a data analytics system, in accordance with one or more embodiments. System 100 includes monitored devices from which data is collected, a datastore for storing a variety snapshots of entity states, and executable modules for performing time-based queries on the entity states based on the snapshots. An entity may be a monitored system, device, application, process, or combination thereof. Devices from which entity state values are received include IOT device 142, IOT device 144, Web-enabled device 146, and Server 148. These devices send data into the datacenter/cloud for analysis. In an embodiment, a single device may represent an entity. However, data collected from multiple devices may together represent a single entity. For example, the contents of a smart refrigerator may be stored in a different snapshot from the contents of a smart pantry, but the contents of both may comprise at least a partial state of the same kitchen in which the registration and pantry reside.

Some devices, such as IOT device 142 and 144, may each have a sensor (143 and 145 respectively) that captures data periodically. A sensor may be a physical hardware component or a software component that gathers information. A thermometer is an example of a sensor that gathers temperature information. Data collected by sensors may have dynamic values that change frequently. Other devices, such as server 148 may run processes that collect metrics data, such as key performance indicator (KPI) data. A metric is a measurement of an attribute or component of an entity. As an example, a level of CPU utilization is a metric of a computer system. The metrics data may also change dynamically over time, but metrics data may change less frequently than sensor data. Some entity properties, such as configuration parameters, have relatively static values. The value of a configuration parameter may be initialized or changed through a user interface or by editing a configuration file. For example, XYZ may be a value of a model name property of a device. A system, such as web-enabled device 146, may allow a user to set or change the value of a configuration parameter. Although not depicted explicitly in FIG. 1, a single device may have any combination of sensors, metrics instrumentation, and configuration data.

Edge Gateway 110 receives data from the monitored devices, and provides the data to the Snapshot Generator 114. The term "original snapshot" is used herein to refer to a snapshot in which an updated value received from a monitored device is originally written without being combined with data already stored in another snapshot. A "combined snapshot" includes values that were retrieved from two or more other snapshots. The snapshot generator 114 generates and stores original snapshots in Snapshots 122 within Snapshot Datastore 120.

Snapshot datastore 120 is a data repository where snapshots are stored and maintained. In one or more embodiments, a data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. In an embodiment, a snapshot may be stored as a row of a database table. For example, a database table may represent partial entity states of a particular entity type. That is, the database table may store a particular combination of entity property values that does not include all property values for the entity. Multiple entities of the same type (e.g, a refrigerator in one kitchen and another refrigerator in a different kitchen) may be represented by partial snapshots that may be stored in the same database table.

In an embodiment, a snapshot may be associated with one entity. A snapshot may represent at least a portion of an entity's state at one point in time and may be immutable. A snapshot is associated with an entity and a set of properties of the entity, and the snapshot stores a value for each of the entity properties associated with the snapshot. In an original snapshot, the timestamp may represent the point in time at which each property value stored in the snapshot was detected, collected, computed, or configured. For example, a partial snapshot may include metric data collected by a software process, such as a CPU utilization, and a timestamp indicating when the CPU utilization was determined (e.g., Oct. 20, 2108, 8:01 pm, 57% CPU utilization). In a combined snapshot, the timestamp may indicate a time of the entity state represented by the consistent set of property values stored in the combined snapshot. In a combined snapshot, the values may have changed at different times, and the timestamp of the combined snapshot may represent a time no earlier than the time the last included value was updated and earlier than the time one of the included values is next updated.

In an embodiment, every time a value is detected, collected, computed, or configured, a new snapshot may be created with the timestamp reflecting the time of update, even if the "new" value is the same value as previously reported. For example, subsequent temperature readings may have the same value, but it may be important to know the latest time the temperature was sensed, and/or over how many time periods the temperature had that same value. In another embodiment, an application may only rely on changes that cause the entity state to change. That is, new snapshots may be created only when the reported value is different from the value in the last recorded snapshot. The word "change" or "update" as used herein may refer to either embodiment and may refer to when a new snapshot is created.

Snapshots 122 may include partial snapshots of entity state. Every time a value for an entity property changes, a new snapshot is created with a timestamp representing the time at which the value was updated. A snapshot may include a single property value and a timestamp when that value was last updated. However, a snapshot may hold a value for more than one property. The set of properties whose values are stored together in a snapshot may be selected based on a common update frequency. For example, if data for multiple properties are updated and received by the edge gateway within a small time window, a single original snapshot may be created to store the multiple values. When multiple values are stored within a snapshot, the timestamp associated with the latest updated value is included in the snapshot, because all of the values represent the entity state as of the latest timestamp. Alternatively or additionally, property values may be stored together in a snapshot because the property values are frequently accessed in the same query. Storing property values together that will be used in the same query may raise the probability that a query can be satisfied by an existing snapshot without requiring combining snapshots before the query can be executed. For example, if a baker frequently asks whether, at the current time, she has sufficient ingredients on hand to bake a cake, she may often form a query that references values for the number of eggs in the refrigerator as well as the amount of flour in the pantry (and the number of eggs on hand may change more frequently than the flour because eggs may be used for many other recipes). Thus, a snapshot could be defined that includes both eggs and flour even though the source of the data comes from different places.

Figure 4:
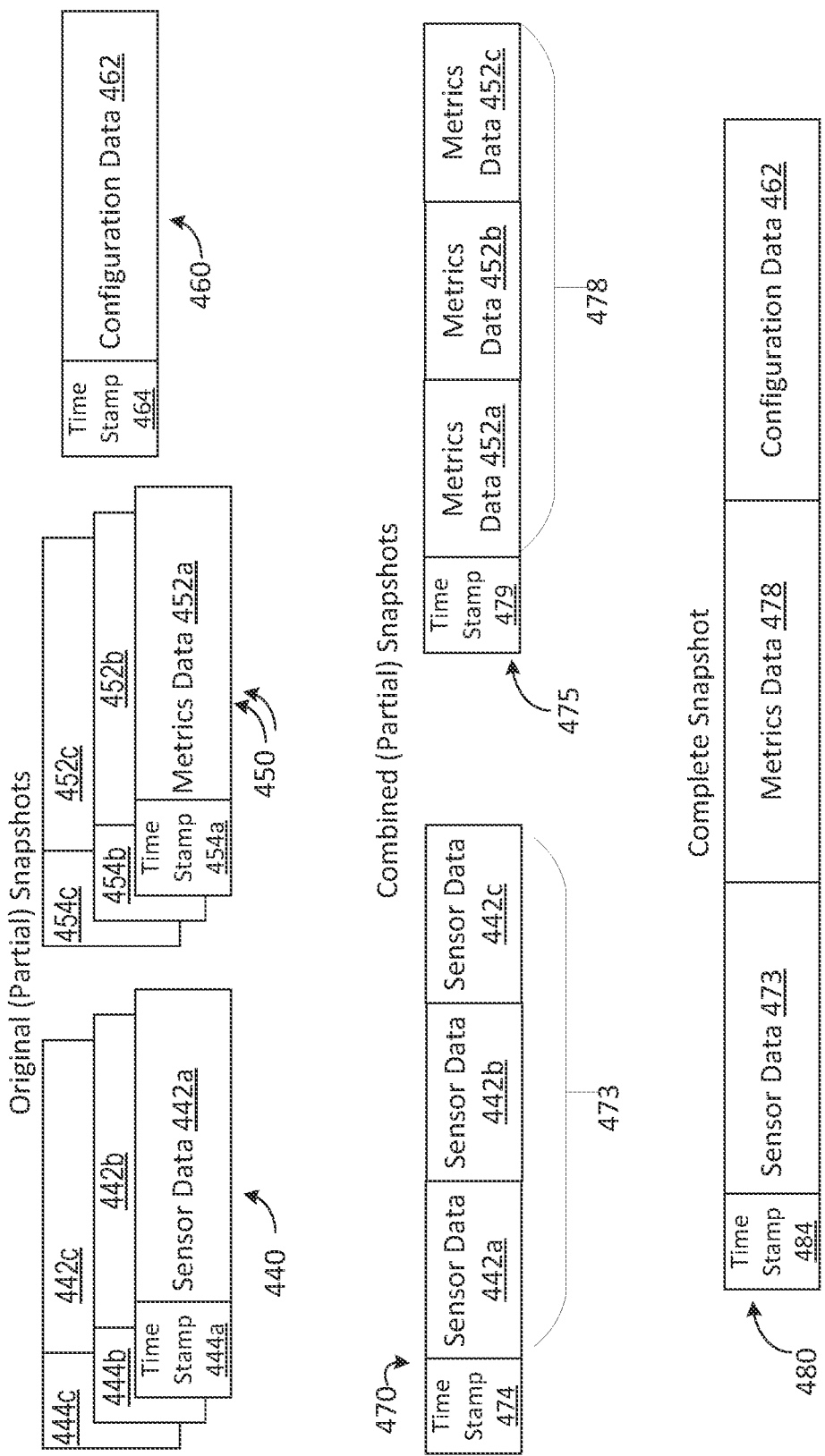
FIG. 4 is a block diagram illustrating original, partial, and complete snapshots, in accordance with one or more embodiments.

A partial snapshot is one that does not include values for all of the entity's properties. A complete snapshot is one that includes values for all of the entity's properties. FIG. 4 is a block diagram illustrating original, partial, and complete snapshots, in accordance with one or more embodiments. FIG. 4 illustrates three collections of original snapshots 440, 450, and 460. Snapshot 440 represents a collection of original sensor snapshots. Each snapshot in the collection holds a timestamp 444*a*, 444*b*, and 444*c* respectively and sensor data 442*a*, 442*b*, and 442*c* respectively. The sensor data in each snapshot includes values reported by one or more sensors at the same time. For example, a weather station device may report temperature and humidity together, and the sensor data 442*a* may include the reported raw values for both temperature and humidity. At a different point in time, a GPS device may report coordinates {latitude, longitude} together which may be stored in the sensor data of 442*b*.

Snapshot 450 represents a collection of original metrics snapshots. Each snapshot in the collection holds a timestamp 454*a*, 454*b*, and 454*c* respectively and metrics data 452*a*, 452*b*, and 452*c* respectively. The metrics data in each snapshot of the collection may include include one or more metrics values that are reported at the same time. For example, a user may define one or more KPIs as a metric SQL query that is scheduled for execution by a processor.

Snapshot 460 is a collection of configuration snapshots. In this example, there is only one configuration snapshot. For example, configuration data 462 may include all of the configuration values used to initially configure the system at a time represented by timestamp 464. In an embodiment, when any of the configuration data value changes, a new original configuration snapshot may be created with the updated value and an updated timestamp. Although not illustrated in FIG. 4, a combined partial snapshot may be created for configuration data that contains the latest values configured with a timestamp indicating the time of last update of any of the changed configuration data.

The original snapshots may be created by the snapshot generator shortly after the snapshot generator receives sensor, metric, or configuration data from the gateway. In an embodiment, the snapshot generator may create a new snapshot immediately upon receiving new data. In another embodiment, the snapshot generator may create snapshots at regular intervals. The snapshot generator may temporarily cache received data, then periodically create snapshots for all of the data received since the last time snapshots were created.

Combined snapshot 470 illustrates a partial combined snapshot that was created by combining sensor snapshots. The sensor data 473 of combined snapshot 470 includes sensor data 442*a*, sensor data 442*b*, and sensor data 442*c*. In other words, snapshot 470 includes the latest reported values for all the sensor data. Combined snapshot 470 is a partial snapshot because snapshot 470 does not include metrics data or configuration data which is part of the entity state. Combined snapshot 470 is a combined snapshot because snapshot 470 was formed by combining at least two other snapshots (i.e. original sensor snapshots). The combined snapshot 470 has only one timestamp 474. Timestamp 474 may correspond to the point-in-time specified by a query. Timestamp 474 may correspond to a latest timestamp of the set of timestamps corresponding respectively to set of partial snapshots that were combined to create the combined snapshot 470.

Similarly, combined partial snapshot 475 illustrates a combined partial snapshot that was created by combining original metrics snapshots. The metric data 478 of combined snapshot 475 includes metric data 452*a*, metric data 452*b*, and metric data 452*c*. In other words, snapshot 475 includes the latest reported values for all the metrics data.

A combined snapshot that represents a complete entity state (includes values for all entity properties) may be referred to as a complete snapshot. Complete Snapshot 480 represents the entire entity state as of timestamp 484. Complete snapshot 480 may be formed by combining snapshot 470, 475, and 460. For some applications, a complete snapshot may only rarely be created because most queries may not reference all entity values for performing the analytics.

Query Engine 130 receives and executes a query by combining snapshots as described above and explained further below.

3. Combining Snapshots at Runtime

Figure 2:
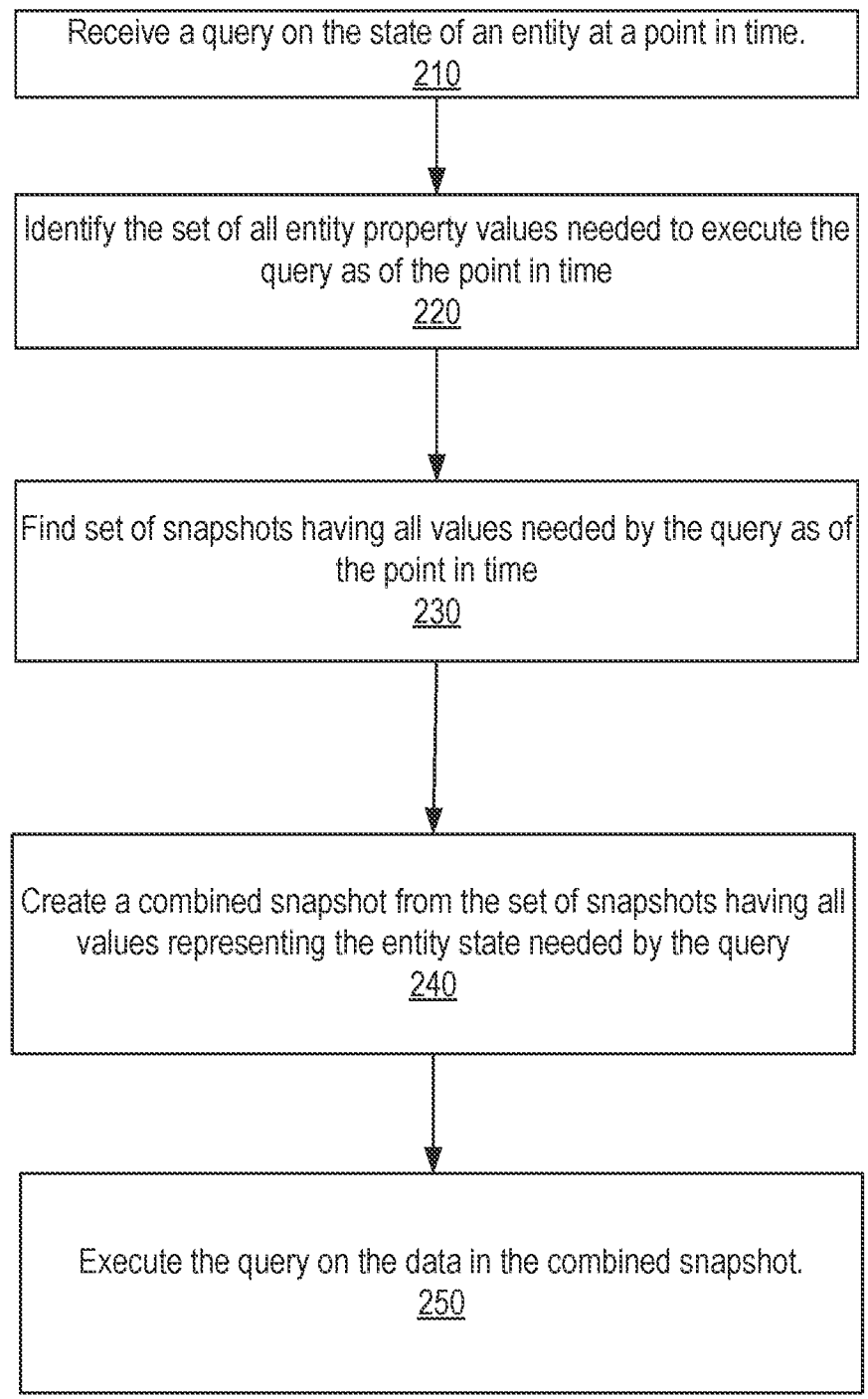
FIG. 2 is a flow diagram illustrating executing a query requiring entity values as of a particular point in time, and the values are stored in partial snapshots of data for an entity in accordance with one or more embodiments.

FIG. 2 is a flow diagram illustrating executing a query requiring entity property values at a particular point in time. The property values are stored in partial snapshots of data for an entity in accordance with one or more embodiments. In Operation 210 a query is received that references data from an entity's state as of a point in time explicitly or implicitly specified by the query. In an embodiment, the query explicitly specifies the point in time for the entity state. In another embodiment, the time point may be implicitly configured by the application running the query. In another embodiment, lack of an explicit or implicit time point specification may indicate that values are needed from the current entity state (that it, state at the time the query is being executed). In Operation 220, query engine 130 analyzes the query to determine the set of entity properties referenced in the query as well as the point in time of the entity state.

In Operation 230, the query engine finds a set of snapshots that collectively include values for all of the entity properties referenced in the query of the entity state at the time point referenced by the query. As such, the snapshots to find each represent a portion of the entity state as of the specified point in time. There may be many partial snapshots, each representing a partial entity state at a different time point. From among a multitude of snapshots representing the same partial entity state over many timepoints, the snapshot to select is the snapshot having the latest timestamp representing a time at or before the specified point in time. Thus, the timestamp of a selected snapshot need not match the specified point in time. Each of the selected snapshots represents a different partial entity state as of the specified point in time. However, the timestamps in each of the selected snapshots may have different values from each other.

In Operation 240, the query engine may combine the snapshots found in Operation 230 to create a new combined snapshot that includes all of the entity data needed by the query. Specifically, each entity property value in the set of found snapshots may also be included in the new combined snapshot. That is, the set of entity property values in the combined snapshot may be the union of values of each of the snapshots being combined. The timestamp value for the combined snapshot may be determined in a variety of ways. Continuing with the example in FIG. 4, if timestamp 444 represents time t1 which is earlier in time than time t2 represented by timestamp 454, then timestamp 474 is constrained to represent a time no earlier than t2. For example, timestamp 474 may be set to represent the later of t1 and t2. However, the query that caused the combined snapshot to be created may have specified a partial entity state as of time t3 that is later than t2. Timestamp 474's value may alternatively be set to represent time t3.

Once the query engine creates a new combined snapshot, the new snapshot may be used as the dataset for executing the query in Operation 250.

Figure 3:
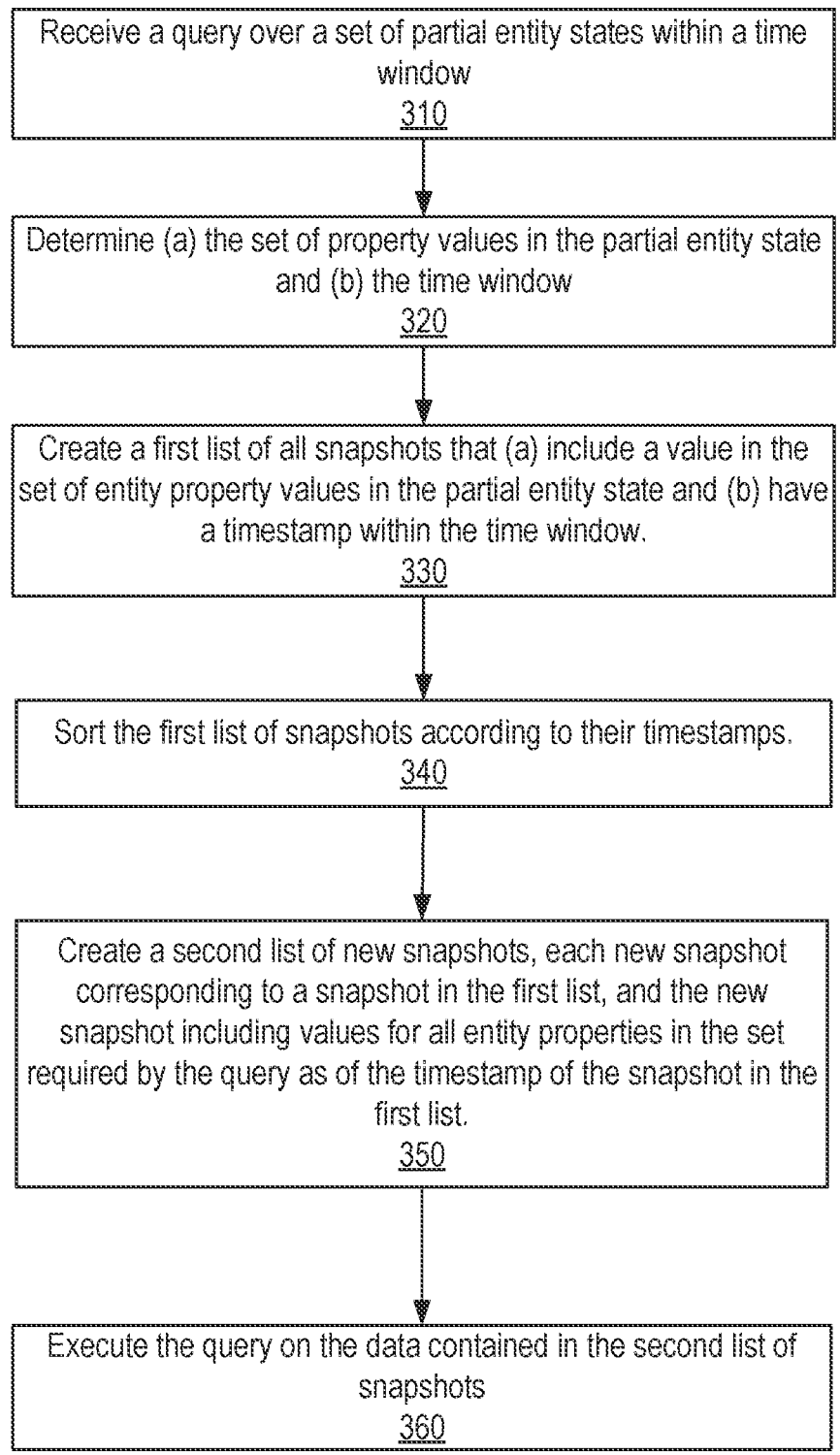
FIG. 3 is a flow diagram illustrating executing a query requiring entity values within a window of time where the values are stored in partial snapshots of data for an entity, in accordance with one or more embodiments.

FIG. 3 is a flow diagram illustrating executing a query requiring entity values within a window of time where the values are stored in partial snapshots of data for an entity, in accordance with one or more embodiments. In Operation 310, the query engine receives a query that specifies a set of operations to perform using values of certain entity properties from entity states within an explicitly or implicitly defined time window. For example, the query may determine an average temperature over the last hour. All temperature values for entity states within the last hour would be needed to execute the query.

In Operation 320, the query engine analyzes the query to identify the set of entity property values needed and the desired time window. In an embodiment, the time window may be explicitly specified in the query. In another embodiment, the time window may be specified implicitly by application configuration. In another embodiment, the time window may be implicitly understood to be a time period whose end time is the current time. For example, the time window may be understood to be the last hour, last day, or last week.

In Operation 330, the query engine creates a list of all snapshots representing at least a partial entity state as of the beginning of the time window and including at least one entity property value needed for the query. Some of the snapshots in the list may have timestamps representing a time before the start of the time window if none of the values has changed between the timestamp and the beginning of the time window. The list may also include all snapshots having a timestamp within the time window.

In Operation 340, the list of snapshots assembled in Operation 320 may be sorted in order of the snapshot timestamps. In an embodiment, all snapshots regardless of which set of entity property values the snapshot holds may be sorted in the list.

In Operations 350, a new combined snapshot is created for every entry in the sorted list. Each new combined snapshot represents at least a partial entity state that provides values for the referenced entity properties specified in the query and represents the partial entity state at a point in time within the specified time window. This new list of combined snapshots forms a dataset over which the query may be executed in Operation 360.

FIGS. 5A, 5B, and 5C illustrate example snapshots representing different points in time for sensor data, metrics data, and configuration data respectively, in accordance with one or more embodiments. FIG. 5A illustrates seven original snapshots of sensor data, each snapshot of which holds a value reported by one of two sensors (Sensor1 or Sensor2). For simplicity of the example, each original snapshot only includes a single value reported by each sensor. However, as explained earlier, each original sensor snapshot may have multiple values reported by one or more sensors at the same time.

For example, at time 50 Sensor 1 reported value S5. Each row in the table represents a distinct snapshot. FIG. 5B illustrates four original snapshots of metrics data, each snapshot of which holds a value for one of two metric properties (Metric1 or Metric2). For example, at time 35, a value of M2 was reported for Metric 2. FIG. 5C illustrates one snapshot holding a configuration parameter. As can be seen in this example, during time 10 and 70, there were more updates to sensor values than metric values, and the value of configuration 1 did not change. The partitioning of properties into tables in the example is only for illustrative purposes and does not represent a restriction on which properties may coexist within a snapshot or how snapshots may be organized and maintained.

FIG. 5D illustrates a combined partial snapshot for sensor data similar to snapshot 470 in FIG. 4, in accordance with one or more embodiments. Each row in the table illustrated in FIG. 5D represents a partial snapshot that combines the data obtained from the original sensor snapshots illustrated in FIG. 5A. In this example, sensor 1 reports a value for a first property of the entity (Property 1), and sensor 2 reports a value for a second property of the entity (Property 2). The combined snapshot of each row represents the sensor state of the entity. Similarly, FIG. 5E illustrates a combined partial snapshot for metrics data similar to snapshot 475 in FIG. 4, in accordance with one or more embodiments. Each row in the table illustrated in FIG. 5E represents a partial snapshot that combines the metrics original snapshots illustrated in FIG. 5B. In this example, metric 1 provides a value for Property 3 of the entity and metric 2 provides a value for Property 4 of the entity. The combined metrics snapshot of each row represents the metrics state of the entity.

In this example, there is only one original snapshot for configuration data. The configuration data provides a value for Property 5 of the entity.

FIG. 6A illustrates the effect of performing Operation 330 on the example snapshots from FIGS. 5C, 5D, and 5E. Each row in FIG. 6A is a partial combined snapshot illustrated as a row from one of FIG. 5C, 5D, or 5E, and the snapshots are listed in timestamp order. The snapshot id column assigns a snapshot identifier for each row in the table that is referred to in FIG. 6B. The values column for FIG. 6A uses a shorthand notation representing the values for the properties included in each type of snapshot. For example, the values in a row of type Sensor snapshot represent values of Property 1 and Property 2.

When Operation 340 is performed on the list of snapshots in FIG. 6A, a new list of snapshots is created as illustrated in FIG. 6B. The representation of FIG. 6B highlights the process of creating new snapshots on the fly and emphasizes which partial snapshots from FIG. 6A are selected to be combined to form each row of FIG. 6B. For example, at time 10, the row of FIG. 6A with snapshot id SS1 having values S1 and null was combined with the snapshot C1 that was updated at time 5. The partial snapshot at time 20 combines MS1 with SS2, instead of SS1, because sensor 2 reported a new value S2 at time 20. At time 50, both sensor and metrics data were updated, and the resulting combined snapshot combines SS5 and MS3.

FIG. 6C illustrates the same combined partial snapshots as FIG. 6B. However, the rows in FIG. 6C illustrate the property values of the partial entity state over various time points to emphasize the outcome of having combined the snapshots as illustrated in FIG. 6B. A new value appears in a snapshot at the time that the value was updated. For example, a value for Property 1 was recorded as S1 at time 10. S1 is the value of Property 1 for snapshots at 15 and 20 during which the value of Property 1 did not change. The downward arrow intends to represent that the value of S1 is present in each subsequent snapshot until the value of Property 1 is updated. A query that references aggregating values of entity states between time 20 and 60 may aggregate values S1, S3, and S5 for Property 1 and values M2 and M3 for Property 4, for example.

4. Example Implementation

In an embodiment, snapshot generator 114 may be implemented as a background daemon running at the data center side. The daemon may wake up each defined period of time (for example, every 2 min) and generate snapshots for all entities updated during the last time window. A separate background daemon may be started for each application running in the datacenter that relies on the snapshots.

MetricSQL is a domain-specific query language designed for Oracle IoT Cloud Services. The language syntax is similar to traditional relational SQL; however, the language operates on business entities at a higher level of abstraction that are managed by the IoT CS instead of referencing low-level database tables.

The goal of metricSQL is to define simple high-level language to query the business entities for their aggregated states, and/or to compute various expressions based on the entity properties. A user can write a metricSQL query on one or more entity states by referencing entity properties of an entity and without knowing anything about the configuration of snapshots in which the values may be stored. For example, here is an example metricSQL query that computes average fuel level for each of several bulldozer entities during a time period when the bulldozer was used:

SELECT AVG ('Sensors'. 'fuelLevel')
FROM 'Bulldozer'
WHERE 'Metric s'. 'sys_utilizationStatus'=true
GROUP BY ENTITY In this example, Sensors fuelLevel is a property name for the entity Bulldozer that indicates how much fuel is in the fuel tank. Metrics.sys_utilizationStatus references a Bulldozer property that is true when the Bulldozer is in use. Although in this example, the property names may have been chosen to suggest in which snapshot each value may reside, such a naming convention is not necessary. MetricSQL need not use snapshot names, and the query writer only needs to know the name of the entity property.

Figure 7:
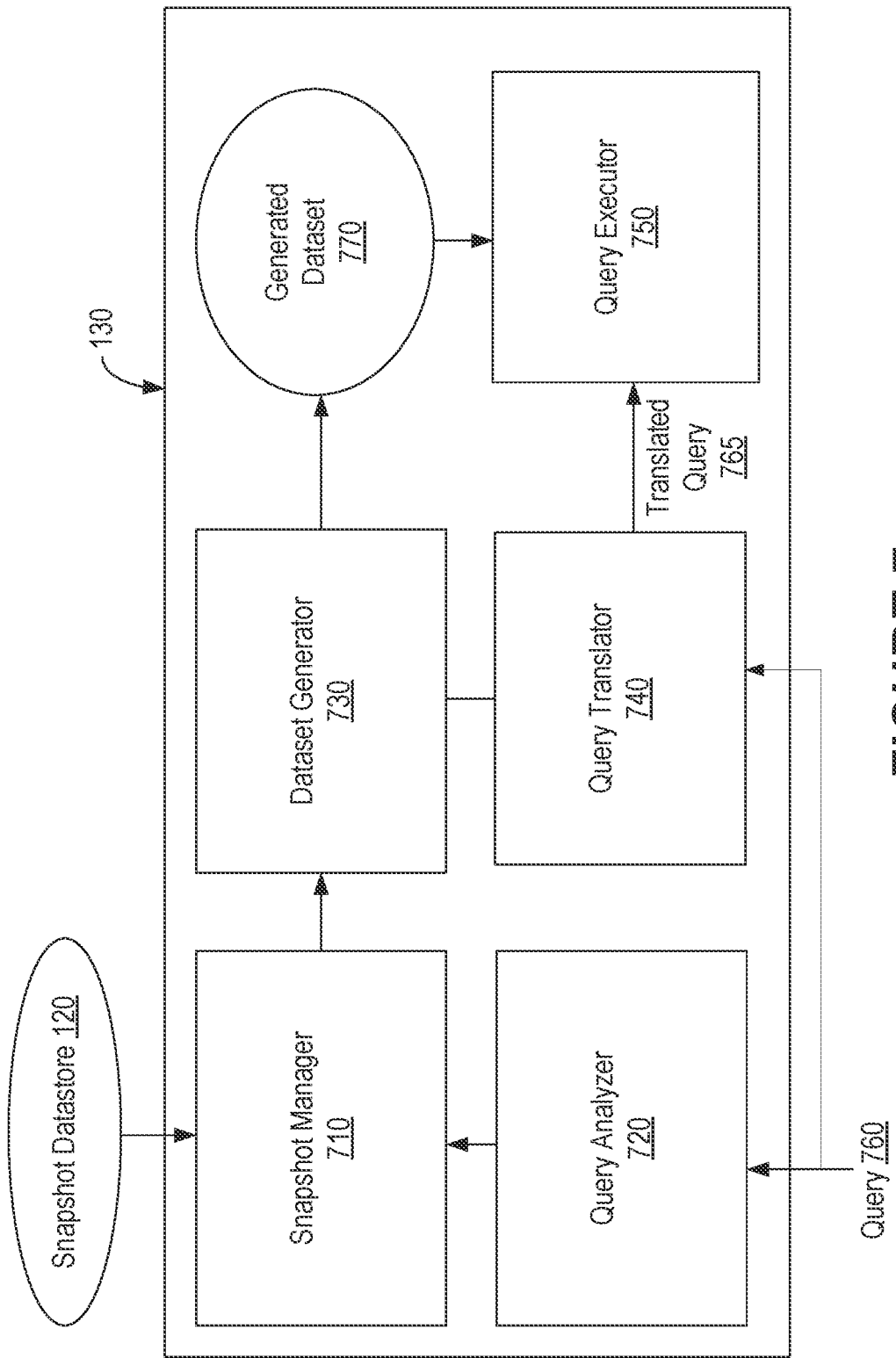
FIG. 7 is a block diagram illustrating components of query engine 130 in accordance with one or more embodiments FIG. 8 Is a block diagram that illustrates a computer system, in accordance with one or more embodiments.

FIG. 7 is a block diagram illustrating certain functional components of query engine 130 in accordance with one or more embodiments. Query Analyzer 720 receives a query 760, such as the above MetricSQL query, and analyzes the query to determine which properties of which entities are referenced. In an embodiment, Query 760 may be written in any SQL-like language supporting the features described herein. In this example, query analyzer 720 identifies the entity type as Bulldozer and finds references to bulldozer properties sensor.fuellevel and Metrics.sys_utilizationStatus in the query. In an embodiment, Query Analyzer 720 may also look for an explicit time point or time window specification in the query. In this example, there is no explicitly specified time reference. Hereinafter, "time reference" is used to mean either a single point in time or a time window indicating one or more entity states specified by the query.

Snapshot Manager 710 may maintain metadata for tracking the availability of snapshots. For example, metadata may comprise a list of partial entity states for each entity type. For each entity property, the snapshot manager may maintain one or more references to a snapshot that includes a value for the property. In an embodiment, the metadata may include a timestamp indicating the time of last update for the property value. In an embodiment, snapshot manager 710 creates a combined snapshot by combining original snapshots for the referenced properties according to the specified time reference.

Using the analysis from the query analyzer 720, snapshot manager 710 may find a snapshot that includes values for the fuel level and another snapshot that includes a value for utilization status. In an embodiment, snapshots may be stored as rows in a database table, and the snapshot manager may use the table name to access the snapshot. For example, a database table may store snapshots representing particular partial entity states for all instances of a particular entity over time. In an embodiment, the snapshot manager may select snapshots based on the time reference.

Dataset Generator 730 may transform the entity property values stored in the snapshots identified by the snapshot manager 710 into a format accessible to the target SQL Query Executor 750. In an embodiment, the set of snapshots identified by the snapshot manager 710 may be combined to create a new dataset. In an embodiment, the combined snapshots may be filtered based on the time reference. The timestamps in each of the snapshots being combined may be different from one another. A simple SQL join on the tables holding the snapshots based on the timestamps may not be able to identify entity property values to be placed into a new combined snapshot because a join operation requires that the corresponding timestamps have the same value. In an embodiment, the new dataset may be a temporary table or other in-memory data structure that is referenced by the target query. In this example, generated dataset 770 represents a partial bulldozer state containing at least values for fuel level and utilization status at or during a time determined by the application rather than specified explicitly by the query.

In an embodiment, combined snapshots created by the dataset generator 730 may be stored and managed by snapshot manager 710. Metadata may track previously combined snapshots in addition to original snapshots. Before selecting snapshots to combine for satisfying a query, the snapshot manager 710 may first determine whether an existing snapshot has the referenced properties representing the state as of the time reference. For example, the snapshot manager can compare the last time each property value was updated to the timestamp of a combined snapshot.

Query Translator 740 may translate query 760 that is written in a query language supporting time-based entity state queries to another, more commonly used query language that need not support time-based entity state queries. The translated query 765 may use a syntax that references one or more datasets created by dataset generator 730. For example, a query written in MetricSQL may be translated into SparkSQL or other variant of the SQL language. "target SQL" as used herein refers to the query language into which query 760 is translated, and "target query" as used herein refers to query 765 that is output by query translator 740.

Query executor 750 executes translated query 765 using one or more generated datasets 770 created by dataset generator 730.

The execution of the functional components described in FIG. 7 may be controlled in a variety of ways. For example, if the MetricSQL query includes an explicit time reference, then the snapshot manager and dataset generator can run before the query translator is run. If an implicit time reference is used, then the snapshot manager and dataset generator may wait until the implicit time reference is determined. A time period that is implied in a MetricSQL query may become explicit in the translated query (765) that is translated to SQL. For example, values of configuration parameters may be retrieved and placed into the target query. Alternatively, the time period may be specified in the translated query using macro parameters such as $(TIME_WINDOW_START) and $(TIME_WINDOW_END). On the execution of the target query, the actual time window boundaries may be given values. If the time reference is not resolved until target query execution, then the snapshot manager and dataset generator may be triggered to run in the context of the query executor 750 after the time reference is determined.

5. Additional Embodiments

In an additional embodiment, a database table may be created to store certain combined snapshots. When a snapshot is combined using other snapshots, the resulting combined snapshot may be stored in a database table for reuse in later computation. In such an embodiment, the metadata may track multiple snapshots for each property value. In an embodiment, before combining snapshots needed to execute a query, the snapshot manager may first determine whether or not the needed entity state has already been created, and if one is found, provide a reference to that existing combined snapshot to the dataset generator.

In an additional embodiment, a snapshot may include property values for more than one entity. This may be advantageous when there are entity types having a relationship with one another. For example, a system entity may comprise multiple devices that are being monitored. Each individual device has entity properties, and the system may have system level properties that depend on values from the devices within the system. A snapshot may be created that represents the system that combines snapshots of values for multiple device entities. For example, a kitchen may be an entity having a partial entity state that includes the property values for a refrigerator and a pantry. Thus, a partial entity state for a kitchen entity may be created by combining a snapshot for a refrigerator and a snapshot for a pantry.

Similarly, a query may specify aggregating values across entities. A snapshot list may be created in which each snapshot in the list represents the state of a distinct entity at the same point in time. For example, a query may determine the average temperature across a geographic region. A thermometer in each city in a metropolitan area may be a sensor for the city in which the thermometer resides. Temperature readings may be taken by each city's thermometer periodically throughout the day and independent of the other thermometers. An average temperature for the area may aggregate the temperature readings across cities within a time window.

In another embodiment, the query engine may reference data that is not found in any snapshot. In such a case, the snapshot manager 710 may send a request to the snapshot generator 114 to create a needed snapshot on demand. If the snapshot generator does not have the referenced data to fulfill the request, the snapshot generator may request the edge gateway to provide the data. The gateway may already have the data cached or the gateway may request one or more devices to send the requested data. In another embodiment, the snapshot manager 710 may send the request for data directly to the edge gateway.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
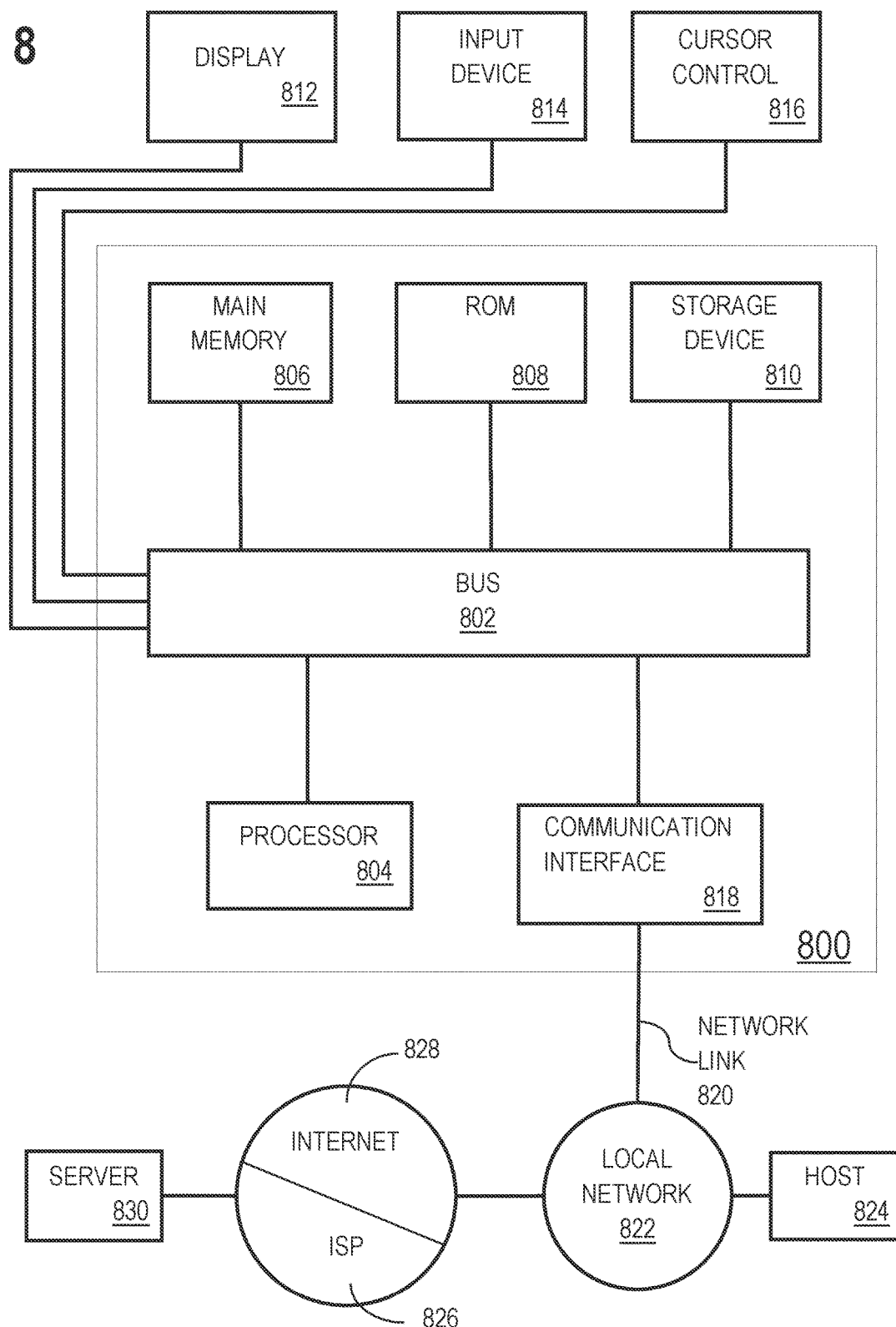

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

What is claimed is:

1. One or more non-transitory machine-readable media storing instructions which, when executed by one or more processors, cause:
   receiving a database query that requires access to a first subset of properties of an entity at a first point in time;
   responsive to receiving the database query, identifying a plurality of snapshots stored in a database including at least a first snapshot and a second snapshot, wherein the plurality of snapshots are selected from a candidate set of partial snapshots stored in the database based on timestamps associated with the set of partial snapshots and the first subset of properties of the entity;
   creating, in the database, a first new partial snapshot using only a subset of the candidate set of partial snapshots that, in combination, comprise values for all of the first subset of properties of the entity as of the first point in time, wherein the first new partial snapshot is not a complete snapshot of the entity at the first point in time and does not include a value of at least one property of the entity stored in at least one of the candidate set of partial snapshots, wherein creating the first new partial snapshot adds a new object to the database for reuse in subsequent query processing, wherein the new object stores values for the first subset of properties as of the first point in time and does not include the value of the at least one property of the entity;
   receiving a second database query that requires access to at least one of the first subset of properties and the at least one property of the entity;
   responsive to receiving the second database query, determining that the first new partial snapshot is available within the database for reuse and, in response, creating a second new snapshot by combining the first new partial snapshot with at least one other partial snapshot.

2. The media of claim 1, wherein the second new snapshot is a partial snapshot that does not include at least a second value of at least one other property of the entity stored in at least one of the candidate set of partial snapshots.

3. The media of claim 1, wherein the second new snapshot is a complete snapshot of the entity that includes all monitored values of the entity as of the first point in time.

4. The media of claim 1, wherein the new object is accessible to a snapshot manager using an object identifier.

5. The media of claim 1, wherein the new object is a new row in a database table.

6. The media of claim 1, wherein the first snapshot includes values provided by sensors.

7. The media of claim 6, wherein the second snapshot includes values for metrics determined by software.

8. The media of claim 1, wherein the instructions further cause: executing the first database query using the first new partial snapshot and the second database query using the second new snapshot.

9. The media of claim 1, wherein the candidate set of partial snapshots consist of partial snapshots that include at least one respective value for at least one of the first subset of properties of the entity and correspond to timestamps that are equivalent to or prior to the first point in time.

10. The media of claim 1, wherein the instructions further cause: configuring a snapshot generator to create additional snapshots at regular intervals based on the second new snapshot.

11. The media of claim 1, wherein the instructions further cause: partitioning, based on query access patterns, sensor data of an entity into different partial snapshot representing different partial entity states.

12. The media of claim 11, wherein the query access patterns include a first pattern of a common access frequency, wherein properties that are frequently accessed by queries are partitioned into a same partial snapshot.

13. The media of claim 11, wherein the sensor data is further partitioned based at least in part on how frequently sensor values for properties are updated, wherein sensor values that are updated frequently are partitioned into a same partial snapshot that does not include properties that are infrequently updated to minimize data replication and redundant storage.

14. The media of claim 1, wherein determining that the first new partial snapshot is available within the database for reuse comprises: creating, responsive to receiving the second query, a list of snapshots that include values for properties of the entity required to execute the second query, wherein the list includes the first new partial snapshot; sorting the list of snapshots according to timestamps; and creating a second list of snapshots that includes the first new partial snapshot and at least one other partial snapshot.

15. The media of claim 1, wherein determining that the first new partial snapshot is available within the database for reuse comprises: determining, by the snapshot manager, whether an entity state has been created before combining any snapshots needed to execute the second query; and responsive to identifying the first new partial snapshot, providing a reference to the first new partial snapshot to a dataset generator.

16. The media of claim 1, wherein the instructions further cause: maintaining, by a snapshot manager, metadata for tracking availability of snapshot, wherein the metadata includes a list of partial entity states for different entity types, and maps an entity property to one or more snapshots that include a value for the property.

17. A system comprising:
   one or more hardware processors;
   one or more non-transitory machine-readable media storing instructions which, when executed by one or more processors, cause:
   receiving a database query that requires access to a first subset of properties of an entity at a first point in time;
   responsive to receiving the database query, identifying a plurality of snapshots stored in a database including at least a first snapshot and a second snapshot, wherein the plurality of snapshots are selected from a candidate set of partial snapshots stored in the database based on timestamps associated with the set of partial snapshots and the first subset of properties of the entity;
   creating, in the database, a first new partial snapshot using only a subset of the candidate set of partial snapshots that, in combination, comprise values for all of the first subset of properties of the entity as of the first point in time, wherein the first new partial snapshot is not a complete snapshot of the entity at the first point in time and does not include a value of at least one property of the entity stored in at least one of the candidate set of partial snapshots, wherein creating the first new partial snapshot adds a new object to the database for reuse in subsequent query processing, wherein the new object stores values for the first subset of properties as of the first point in time and does not include the value of the at least one property of the entity;

receiving a second database query that requires access to at least one of the first subset of properties and the at least one property of the entity;

responsive to receiving the second database query, determining that the first new partial snapshot is available within the database for reuse and, in response, creating a second new snapshot by combining the first new partial snapshot with at least one other partial snapshot.

18. A method comprising:

receiving a database query that requires access to a first subset of properties of an entity at a first point in time;

responsive to receiving the database query, identifying a plurality of snapshots stored in a database including at least a first snapshot and a second snapshot, wherein the plurality of snapshots are selected from a candidate set of partial snapshots stored in the database based on timestamps associated with the set of partial snapshots and the first subset of properties of the entity;

creating, in the database, a first new partial snapshot using only a subset of the candidate set of partial snapshots that, in combination, comprise values for all of the first subset of properties of the entity as of the first point in time, wherein the first new partial snapshot is not a complete snapshot of the entity at the first point in time and does not include a value of at least one property of the entity stored in at least one of the candidate set of partial snapshots, wherein creating the first new partial snapshot adds a new object to the database for reuse in subsequent query processing, wherein the new object stores values for the first subset of properties as of the first point in time and does not include the value of the at least one property of the entity;

receiving a second database query that requires access to at least one of the first subset of properties and the at least one property of the entity;

responsive to receiving the second database query, determining that the first new partial snapshot is available within the database for reuse and, in response, creating a second new snapshot by combining the first new partial snapshot with at least one other partial snapshot.

19. The method of claim 18, wherein the new object is accessible to a snapshot manager using an object identifier.

20. The media of claim 18, wherein the new object is a new row in a database table.

* * * * *

UNITED STATES PATENT AND TRADEMARK OFFICE
CERTIFICATE OF CORRECTION

| | | |
|---|---|---|
| PATENT NO. | : 12,373,389 B2 | Page 1 of 1 |
| APPLICATION NO. | : 18/542267 | |
| DATED | : July 29, 2025 | |
| INVENTOR(S) | : Troshin et al. | |

It is certified that error appears in the above-identified patent and that said Letters Patent is hereby corrected as shown below:

In the Specification

In Column 2, Lines 17-18, delete "embodiments" and insert -- embodiments; --, therefor.

In Column 5, Line 54, delete "include include" and insert -- include --, therefor.

In Column 9, Line 60, delete "'Metric s'. 'sys" and insert -- 'Metrics'.'sys --, therefor.

In Column 9, Line 62, delete "Sensors fuelLevel" and insert -- Sensors.fuelLevel --, therefor.

In Column 13, Line 10, delete "link" and insert -- link. --, therefor.

In the Claims

In Column 22, Line 26, in Claim 20, delete "media" and insert -- method --, therefor.

Signed and Sealed this
Sixteenth Day of December, 2025

John A. Squires
*Director of the United States Patent and Trademark Office*